United States Patent
Cai et al.

(10) Patent No.: US 7,746,355 B1
(45) Date of Patent: Jun. 29, 2010

(54) METHOD FOR DISTRIBUTED CLIPPING OUTSIDE OF VIEW VOLUME

(75) Inventors: Mike Cai, Newark, CA (US); Lin Tan, Cupertino, CA (US); Frido Garritsen, Hayward, CA (US); Ming Chen, San Jose, CA (US)

(73) Assignee: Vivante Corporation, Sunnyvale, CA (US)

( * ) Notice: Subject to any disclaimer, the term of this patent is extended or adjusted under 35 U.S.C. 154(b) by 579 days.

(21) Appl. No.: 11/657,966

(22) Filed: Jan. 24, 2007

(51) Int. Cl.
  *G09G 5/00* (2006.01)
(52) U.S. Cl. .................. 345/620; 345/623; 345/624
(58) Field of Classification Search ......... 345/619–624, 345/427, 607
See application file for complete search history.

(56) References Cited

U.S. PATENT DOCUMENTS

| | | | | |
|---|---|---|---|---|
| 5,157,764 | A * | 10/1992 | Priem et al. | 715/803 |
| 6,618,048 | B1 * | 9/2003 | Leather | 345/422 |
| 6,819,332 | B2 * | 11/2004 | Baldwin | 345/611 |
| 7,162,716 | B2 * | 1/2007 | Glanville et al. | 717/151 |
| 7,184,059 | B1 * | 2/2007 | Fouladi et al. | 345/604 |
| 7,292,242 | B1 * | 11/2007 | Wittenbrink et al. | 345/421 |
| 7,292,254 | B1 * | 11/2007 | Yue et al. | 345/620 |
| 7,439,988 | B1 * | 10/2008 | Parikh et al. | 345/620 |
| 2002/0130886 | A1 * | 9/2002 | Baldwin | 345/611 |

OTHER PUBLICATIONS

Ned Greene, Hierarchical Polygon Tiling with Coverage Masks, 1996, ACM.*
Molnar et al., A Sorting Classification of Parallel Rendering, 1994, IEEE Computer Graphics and Applications.*

* cited by examiner

*Primary Examiner*—Hau H Nguyen
(74) *Attorney, Agent, or Firm*—Stevens Law Group; David R. Stevens

(57) ABSTRACT

A distributed clipping scheme is provided, view frustum culling is distributed in several places in a graphics processing pipeline to simplify hardware implementation and improve performance. In general, many 3D objects are outside viewing frustum. In one embodiment, clipping is performed on these objects with a simple algorithm in the PA module, such as near Z clipping, trivial rejection and trivial acceptance. In one embodiment, the SE and RA modules perform the rest of clipping, such as X, Y and far Z clipping. In one embodiment, the SE module performs clipping by way of computing a initial point of rasterization. In one embodiment, the RA module performs clipping by way of conducting the rendering step of the rasterization process. This approach distributes the complexity in the graphics processing pipeline and makes the design simpler and faster, therefore design complexity, cost and performance may all be improved in hardware implementation.

20 Claims, 3 Drawing Sheets

METHOD FOR DISTRIBUTED CLIPPING OUTSIDE OF VIEW VOLUME

CROSS REFERENCE TO RELATED APPLICATIONS

The present application relates to U.S. patent application Ser. No. 11/592,799, filed on Nov. 3, 2006, entitled "HIERARCHICAL TILE-BASED RASTERIZATION ALGORITHM" which is incorporated herein by reference.

BACKGROUND

1. Field of the Invention

The invention relates generally to the field of computer systems and more particularly to 3D computer graphics processor.

2. Description of Related Art

In 3D computer graphics, the view frustum is the region of a three dimensional space in the modeled world that may appear on a computer display screen represented by the 2D screen space (hereinafter also referred to as the screen space). The exact shape of the view frustum may vary, e.g. it may be a rectangular cube, a rectangular pyramid, or other suitable geometric shape. In an example, the frustum may be formed with six planes: near plane, far plane, +X plane, -X plane, +Y plane, and -Y plane. The planes that cut the view frustum perpendicular to the viewing direction are called the near plane and the far plane, which may also be called the near Z plane and the far Z plane.

3D objects in the view frustum may be represented by multiple geometric primitives, such as polygons, triangles, line segments, points, or other appropriate geometric elements. Geometric primitives that fall outside of the view frustum will not be visible and may be discarded, removed, or abandoned, in view frustum clipping, or culling, operation of the graphics processing pipeline. Here, culling refers to the complete removal of a geometric primitive which is completely outside of the view frustum while clipping refers to the partial removal of a geometric primitive which has a partial portion outside of the view frustum. Culling may be considered as a special case of clipping where the partial portion removed defaults to the complete geometric primitive. Clipping/culling 3D objects outside of the view frustum is not necessary to achieve a correct image output, but it accelerates the rendering process by eliminating the unneeded rasterization and post-processing on primitives that will not appear on the computer display screen anyway. Graphics processing pipeline typically includes a primitive assembly module (hereinafter referred to as the PA module) where 3D objects, which may be represented by multiple vertices computed from a vertex shader module, are converted to geometric primitives such as triangles, lines, points, polygons, or other appropriate geometric elements. For example, lines may be drawn from a starting-point (or starting-vertex) to an ending-point (or an ending-vertex) in order to pass conformance tests. The reason is that the ending-vertex may or may not be part of the line. PA module may also perform a conversion from the view frustum to the 2D screen space. In some examples, only the X and Y coordinates are transformed into screen space, while the per-pixel Z values may be stored in a Z-buffer. After processed by the PA module, the primitives are in the screen space. The rest of the pipe acts only on the screen space. In some examples, a clipping block may be added behind a primitive assembly block and before the SE module. In this case, the primitive assembly block would just assemble the primitives, the clipper block would clip the primitives and generate more primitives based on this clipping and than pass it on to a transformation pipe which transforms the clipped primitives to the screen space before it enters the SE module. This whole pipe including the primitive assembly block, clipper block, and the transformation pipe is called the PA module. Graphics processing pipelines typically also include a rasterization module (hereinafter referred to as the RA module) where all the pixels in a clipping window inside the 2D screen space are rendered. The RA module operates on the clipping window which may be a portion of the view frustum. Pixels in the screen space outside of the clipping window also need to be clipped/culled, i.e., discarded, removed, or abandoned. In addition to the primitive assembly module and the rasterization module, there may also be additional set up functions (e.g., computing an initial point of rasterization for a primitive) performed in a set up module (hereinafter referred to as the SE module). In the prior art, clipping/culling of 3D objects outside of the view frustum is typically done in a single place inside a graphics processing pipeline. Such an implementation can cause a bottleneck in the pipeline because of the large number of computation required for performing clipping/culling. For an example, view frustum clipping/culling may be done in the screen space. In this example, all the 3D objects are transformed to screen space and sent to the setup engine to do the clipping according to the clipping window. The advantage of this approach is that the hardware in the PA module may be very simple. The disadvantage is that all the 3D objects need to be transformed to screen space, even the objects outside of view frustum or clipping window. This may increase complexity and cost of the graphics processing pipeline implementation. In another example, all 6-plane clipping may be done in the view frustum before the conversion to the 2D screen space. The advantage of this approach is that all polygons outside of the view frustum are clipped; only the polygons inside the view frustum are transformed to screen space and sent to setup engine. The disadvantage of this approach is that the algorithm of doing 6 plane clipping is complex and expensive for hardware implementation.

SUMMARY OF THE INVENTION

In general, in one aspect, the present invention involves a method for clipping in a 3D computer graphics processing pipeline, the 3D computer graphics processing pipeline comprises a view frustum, a clipping window, a primitive assembly (PA) module, a set up (SE) module, and a rasterization (RA) module, the method comprising: obtaining a primitive using the PA module; performing a first clipping of the primitive using the PA module; determining an initial point of rasterization for the primitive using the SE module; performing a second clipping of the primitive using the SE module; rendering the primitive using the RA module; and performing a third clipping of the primitive using the RA module.

Other aspects and advantages of the invention will be apparent from the following description and the appended claims.

BRIEF DESCRIPTION OF DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are

DETAILED DESCRIPTION OF THE INVENTION

Figure 1:
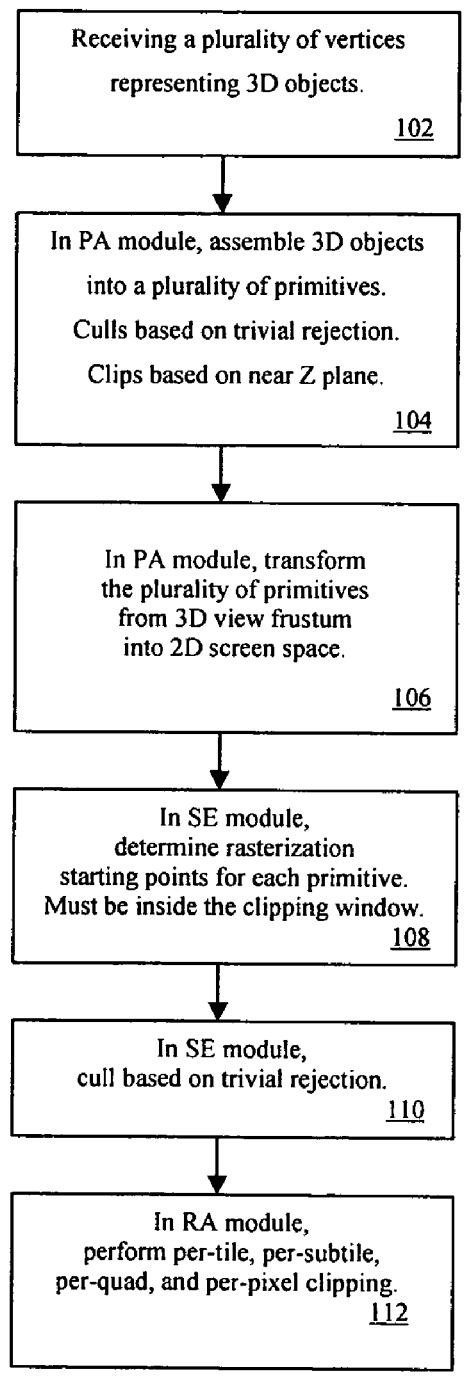
FIG. 1 is a flow chart diagram illustrating an overall clipping/culling procedure of a graphics processing pipeline according to one embodiment of the present invention.

FIG. 1 is a flow chart diagram illustrating an overall clipping/culling procedure of the graphics processing pipeline according to one embodiment of the present invention. As an example, the graphics processing pipeline includes the PA module, the SE module and the RA module. Here, step 102 receives multiple vertices representing 3D objects. In some examples, the vertices may be received from a vertex shader module which computes these vertices for representing 3D objects. Step 104 converts these 3D objects from vertices to geometric primitives, such as points, line segments (hereafter referred to as lines), triangles, or other appropriate geometric shapes. In an example, the PA module is configured in a triangle mode. In triangle mode, the vertices are converted into multiple triangles before any further processing. In another example, the PA module is configured in a line mode and converts the vertices into multiple lines before any further processing. In yet another example, the PA module is configured in point mode and converts the vertices into multiple points before any further processing. The points may be associated with a position attribute and a size attribute that may be used in rendering steps later in the graphics processing pipeline. Continuing the discussion of step 104, triangles and lines which are completely outside the view frustum are removed, which is known as trivial rejection to those skilled in the art. If any triangle or line is partially inside the view frustum and partially outside the view frustum, only near plane clipping, or near Z clipping, will be applied to the triangle or line.

In an example, step 104 may be implemented as the following algorithm where (Xc, Yc, Zc) is the coordinate of a vertex in the view frustum, which is bounded by six planes defined as (a)+X plane: Xc=Wc, (b)–X plane: Xc=–Wc, (c)+Y plane: Yc=Wc, (d) –Y plane: Yc=–Wc, (e) near Z plane: Zc=0, and (f) far Z plane: Zc=Wc. Here, the +X, –X, +Y and Y planes form a X, Y clipping rectangle of the view frustum. The algorithm includes:

(1) Perform clipping for the triangle and line mode, don't perform clipping for the point mode.

(2) Check +X and –X planes, if all the vertices of triangle or line are Xc <–Wc or Xc>Wc, the triangle or line is culled.

(3) Check +Y and –Y planes, if all the vertices of triangle or line are Yc <–Wc or Yc>Wc, the triangle or line is culled.

(4) Check near Z and far Z planes, if all the vertices of triangle or line are Zc<0 or Zc>Wc, the triangle or line is culled.

(5) Check near Z again, if some vertices' Zc<0 and some Zc >=0, perform near Z clipping.

In the above exemplar algorithm, the near Z clipping may be performed by various methods known to one skilled in the art of 3D computer graphics. What is an important aspect of the present invention is that not all steps of view frustum clipping/culling are performed in one single location in the graphics processing pipeline.

After clipping in the view frustum, the coordinates of primitives may be transformed to screen space in step 106, and sent to the SE module and the RA module to perform the rest of the clipping.

Continuing the discussion of FIG. 1 to step 108, the SE module determines the initial point of rasterization which must be inside the clipping window. Additional clipping/culling may be performed during this determination process. Here the clipping window resides in the screen space. In one example, the SE module starts with the vertices of a triangle or a line inside the clipping window as the initial point of rasterization. If none of the vertices are inside the clipping window, it computes the initial point of rasterization as a point which is both inside clipping window and inside the triangle or part of the line. As an example, if the vertices of a line are outside the clipping window, the SE module may compute the intersection of the line and the clipping window as the initial point of rasterization. If no such intersection can be found, the line is culled. In another example, where the PA module is configured in point mode, each point as a geometric primitive may be converted to a polygon with appropriate size according to the associated size attribute in the SE module. The polygon may be further converted as one or more triangles. In step 110, the SE module implements the trivial rejection for the points after the polygon conversion. In an example, points are trivially rejected inside the PA module and the SE only culls if the entire primitive is outside the clipping window or beyond the far Z plane. In another example, the SE module performs trivial rejection (culling) if it cannot find any intersection with the clipping window or the primitive is beyond the far Z plane. In other examples, SE module may perform the trivial rejection to all geometric primitives including the triangles and lines for ease of implementation without having to differentiate between the modes in which the PA module is configured or to differentiate between geometric primitives. In one example, the trivial rejection is performed by way of computing the initial point of rasterization inside the clipping window. One skilled in the art will appreciate that the invention may be practice with SE module performing the trivial rejection either including or excluding the other geometric primitives.

In step 112 of FIG. 1, the RA module performs per-tile, per-subtile, per-quad, and per-pixel clipping. Rasterization in the RA module may be implemented in various manners known to one skilled in the art of 3D computer graphics. In an example, the rasterization may be implemented in a hierarchical approach, such described in U.S. patent application Ser. No. 11/592,799, filed on Nov. 3, 2006, entitled "HIERARCHICAL TILE-BASED RASTERIZATION ALGORITHM" which is incorporated herein by reference. In this exemplary rasterization method, the per-tile, per-subtile, per-quad, and per-pixel clipping are performed at the same time as the per-tile, per-subtile, per-quad, and per-pixel rendering steps of the rasterization method.

Figure 2:
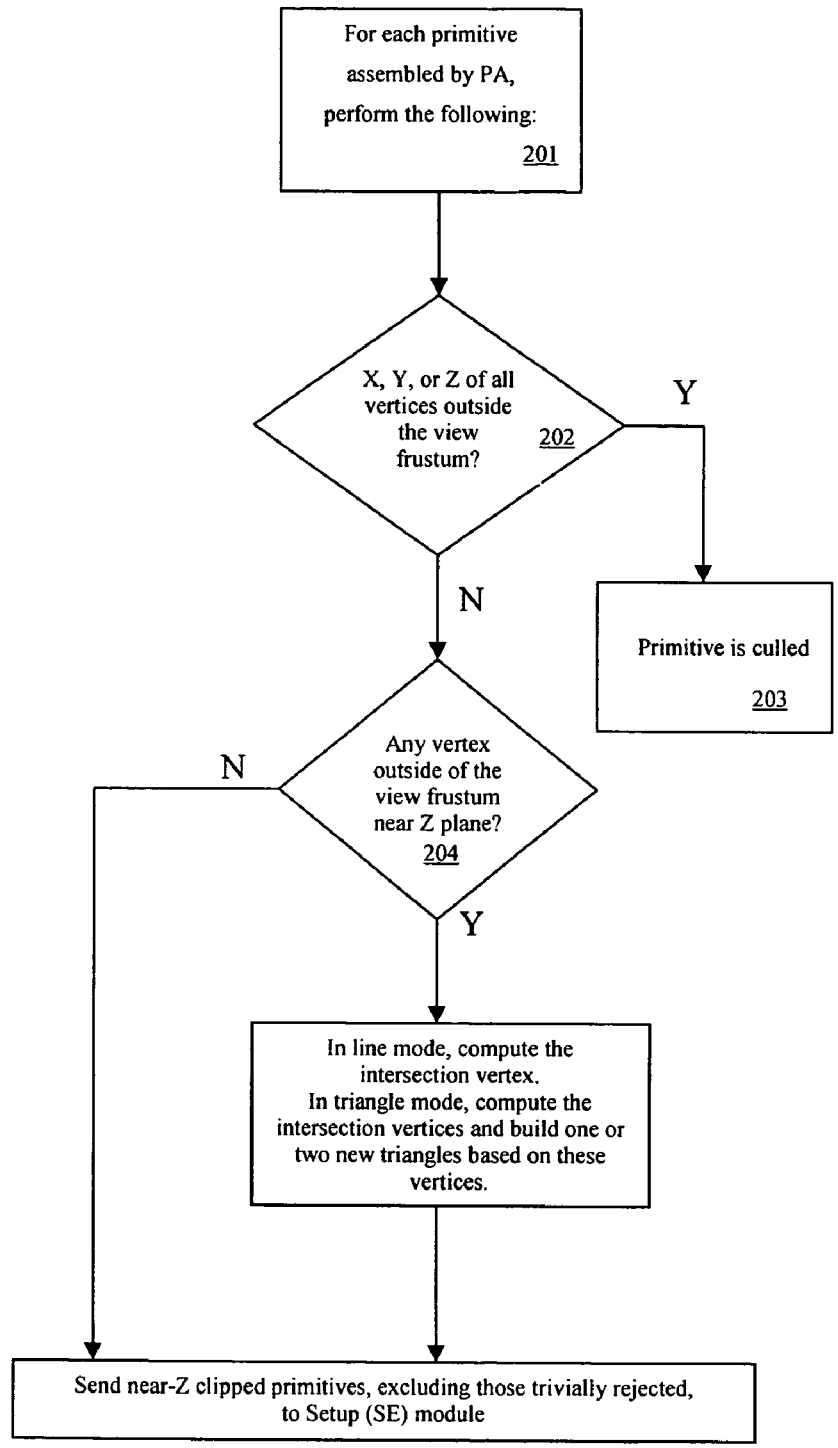
FIG. 2 is a flow chart diagram illustrating clipping/culling procedure in the PA module of the graphics processing pipeline according to one embodiment of the present invention.

FIG. 2 is a flow chart diagram illustrating clipping/culling procedure in the PA module of the graphics processing pipeline according to one embodiment of the present invention. Here, a primitive such as a point, a line, or a triangle is assembled from vertices by the PA module in step 201. A decision is made in step 202 as to if X, Y, or Z of all vertices of the primitive lie outside the view frustum. If the decision is yes, the primitive is culled in step 203. If the decision is no, then another decision is made in step 204 as to if the nearest Z of any vertex is outside the view frustum. If the decision is yes, then near Z clipping is performed. In an example, for a line, the intersection with the view frustum may be computed and sent to the setup (SE) module; for a triangle, the vertices and sent to SE module. If the decision of step 204 is no, then the primitive is sent to the SE module without further processing.

Figure 3:
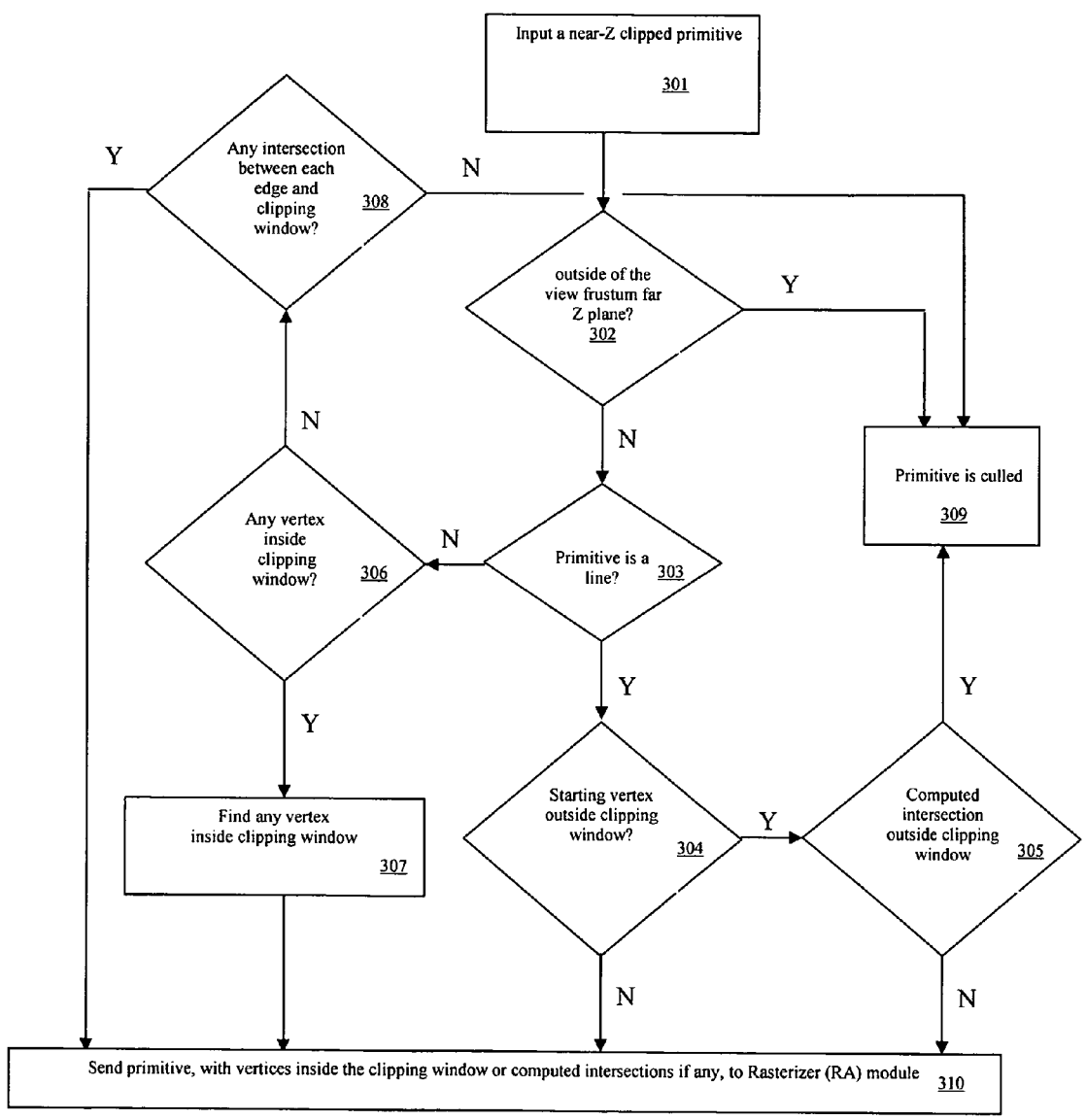
FIG. 3 is a flow chart diagram illustrating clipping/culling procedure in the SE module of the graphics processing pipeline according to one embodiment of the present invention.

FIG. 3 is a flow chart diagram illustrating clipping/culling procedure in the SE module of the graphics processing pipeline according to one embodiment of the present invention. In some examples, SE module computes initial points of rasterization to be used by the RA module for rendering the primitives in the rasterization process. In an example, a vertex inside the clipping window may be chosen as the initial point of rasterization. If all vertices are outside the clipping window, SE module performs necessary clipping and compute another initial point of rasterization. Here in step 301, a near-Z clipped primitive, which is not trivially rejected in the PA module, is input to the SE module. In some examples, only the X and Y coordinates are transformed into screen space, while the per pixel Z values are stored in a Z-buffer. Then a decision is made in step 302 as to if any vertices of the primitive is outside the far Z plane of the view frustum. If the decision is yes, then the entire primitive is culled in the far Z clipping/culling (step 309). If the decision of step 302 if no, then another decision is made in step 303 as to if the primitive is a line. For the case that the PA module is configured in the line mode and the primitive is a line, the method proceeds to step 304 where the decision is made as to if the starting vertex is outside the clipping window. If the decision is no, the line is sent to the RA module (step 310). If the decision is yes, then the intersection of the line with the clipping window is computed in step 305 and a decision is made as to if the intersection is still outside the clipping window. For example, since the line is two-dimensional, only one coordinate is clipped. For example, if a line is x-major, the clipping is done by computing the y value at the nearest x clipping boundary (left or right border). The computed y-coordinate still needs to be verified if it is outside the clipping window. If the decision is yes, then the line is culled (step 309). If the decision is no, then the line is sent to the RA module with the computed intersections (step 310). Continuing to the decision made in step 303, for the case that the primitive is not a line, another decision is made in step 306 as to if any vertex of the primitive is inside the clipping rectangle. If no vertex is found inside the clipping window, the method proceeds to step 308 and intersections of each edge of the primitive with the clipping window are computed. If no intersection can be found that lies inside the clipping window, the entire primitive is culled (step 309). If any intersection exists, the primitive is sent to RA module with the first computed intersection as the initial point of rasterization (step 310). Continuing to the decision made in step 306, for the case that any vertex of the primitive is inside the clipping window, the vertex of the primitive that lies within the clipping window will be chosen to be the initial point of rasterization and the primitive is sent to RA module with the found vertex (step 307).

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

We claim:

1. A method for clipping in a 3D computer graphics processing pipeline, the 3D computer graphics processing pipeline comprises a view frustum, a clipping window, a primitive assembly (PA) module, a set up (SE) module, and a rasterization (RA) module, the method comprising:
   obtaining a primitive using the PA module;
   performing a first clipping of the primitive with respect to the view frustum using the PA module, wherein the first clipping includes culling based on trivial rejection and clipping based on near-Z plane only;
   determining an initial point of rasterization for the using the SE module;
   performing a second clipping of the primitive with respect to the view frustum using the SE module;
   rendering the primitive using the RA module; and
   performing a third clipping of the primitive using the RA module.

2. The method of claim 1, wherein the primitive comprises one or more vertex, and wherein the first clipping removes the primitive if the primitive has no vertex inside the view frustum.

3. The method of claim 1, wherein the primitive comprises one or more vertices, and wherein the second clipping comprises removing the primitive if the initial point of rasterization for the primitive can not be determined inside the clipping window.

4. The method of claim 1, wherein the third clipping comprises:
   (a) inputting the initial point of rasterization for the primitive;
   (b) determining if the primitive is a line or a triangle; and
   (c) if the primitive is a triangle, rasterizing the triangle in a hierarchical manner, comprising:
      (c1) walking a plurality of tiles of pixels and determining if each tile is valid;
      (c2) breaking each valid tile into a plurality of subtiles and determining if each subtile is valid;
      (c3) breaking each valid subtile into a plurality of quads and determining if each quad is valid; and
      (c4) rendering pixels for each valid quad, wherein steps (c1) through (c4) are performed in parallel.

5. The method of claim 4, wherein the breaking step (c2) comprises:
   (c2i) breaking each valid tile into the plurality of subtiles;
   (c2ii) walking the plurality of subtiles; and
   (c2iii) determining if each subtile is valid.

6. The method of claim 5, wherein the walking of the plurality of subtiles is performed in a same manner as the walking of the plurality of tiles.

7. The method of claim 4, wherein the breaking step (c3) comprises:
   (c3i) breaking each valid subtile into the plurality of quads;
   (c3ii) walking the plurality of quads; and
   (c3iii) determining if each quad is valid.

8. The method of claim 7, wherein the walking of the plurality of quads is performed in a same manner as the walking of the plurality of tiles and a walking of the plurality of subtiles.

9. The method of claim 4, wherein validation of a block, wherein the block comprises a tile, a subtile, or a quad, comprises:
   checking if a pixel in the block sits on the left, right, or exactly on a line of a triangle using edge equations;

checking four corners of the block against three edges of the triangle and returning a combined result;

determining if the block contains any pixels inside the triangle, based on the combined result; and determining that the block is valid, if the block contains at least one valid pixel inside the triangle.

10. The method of claim 9, further comprising:

abandoning the block, if the block does not contain at least one valid pixel inside the triangle.

11. The method of claim 4, further comprising:

(d) if the primitive is a line, computing pixels for each quad of pixels for the line; and (e) rendering pixels for each valid quad.

12. The method of claim 1, wherein the primitive has a position and a size, and wherein the first clipping removes the primitive if the position is outside of the view frustum.

13. The method of claim 12, wherein the primitive is converted into a polygon according to the size, wherein the polygon is converted into a plurality of triangles in the SE module, and wherein the second clipping removes a triangle if the triangle has no vertex inside the clipping window.

14. The method of claim 13, wherein the third clipping comprises:

(a) inputting the initial point of rasterization for the triangle; and (b) rasterizing the triangle in a hierarchical manner, comprising:

(b1) walking a plurality of tiles of pixels and determining if each tile is valid;

(b2) breaking each valid tile into a plurality of subtiles and determining if each subtile is valid;

(b3) breaking each valid subtile into a plurality of quads and determining if each quad is valid; and (b4) rendering pixels for each valid quad, wherein steps (b1) through (b4) are performed in parallel.

15. The method of claim 14, wherein the breaking step (b2) comprises:

(b2i) breaking each valid tile into the plurality of subtiles;

(b2ii) walking the plurality of subtiles; and (b2iii) determining if each subtile is valid.

16. The method of claim 15, wherein the walking of the plurality of subtiles is performed in a same manner as the walking of the plurality of tiles.

17. The method of claim 14, wherein the breaking step (b3) comprises:

(b3i) breaking each valid subtile into the plurality of quads;

(b3ii) walking the plurality of quads; and (b3iii) determining if each quad is valid.

18. The method of claim 17, wherein the walking of the plurality of quads is performed in a same manner as the walking of the plurality of tiles and a walking of the plurality of subtiles.

19. The method of claim 14, wherein validation of a block, wherein the block comprises a tile, a subtile, or a quad, comprises:

checking if a pixel in the block sits on the left, right, or exactly on a line of a triangle using edge equations;

checking four corners of the block against three edges of the triangle and returning a combined result;

determining if the block contains any pixels inside the triangle, based on the combined result; and determining that the block is valid, if the block contains at least one valid pixel inside the triangle.

20. The method of claim 19, further comprising:

abandoning the block, if the block does not contain at least one valid pixel inside the triangle.

* * * * *